Jan. 22, 1963 H. P. WOLFF 3,074,637

GYRATOR APPARATUS AND METHOD FOR HANDLING INFORMATION

Filed Aug. 11, 1958 2 Sheets-Sheet 2

United States Patent Office 3,074,637
Patented Jan. 22, 1963

3,074,637

GYRATOR APPARATUS AND METHOD FOR HANDLING INFORMATION

Hermann P. Wolff, Millbrook, N.Y., assignor to International Business Machines Corporation, New York, N.Y., a corporation of New York Filed Aug. 11, 1958, Ser. No. 754,393
8 Claims. (Cl. 235—164)

This invention relates to apparatus and methods for information handling and more particularly to the performance of logical operations, for example, in computing.

In accordance with the invention, various items of information are represented as different directions of polarization of a plane polarized wave, with respect to the direction of polarization of a plane polarized reference wave. As an example, the reference wave without rotation of its direction of polarization may be used to represent the binary digit zero, and a wave which has had its direction of polarization rotated through a suitable angle $\theta$ with respect to the reference wave may be used to represent the binary digit one. In a preferred embodiment of the invention the angle $\theta$ is 90 degrees.

Various items of information may be combined, using a plane polarized wave as a carrier of information and impressing thereon successive rotations of direction of polarization.

The invention is not, in its broadest sense, limited to the handling of binary digits, but is applicable to the handling of a wide variety of types of information. However, binary digits serve as a convenient illustration.

In an illustrative system involving just two binary digits to be combined and where $\theta$ is 90 degrees, four cases may be distinguished: (1) Rotation zero followed again by rotation zero; (2) rotation 90 degrees followed by rotation zero; (3) rotation zero followed by rotation 90 degrees; and (4) rotation 90 degrees followed again by rotation 90 degrees. A system which will respond equally well in cases (2) and (3) may be used as a logical exclusive-or system while a system which will respond only in case (4) may be used as a logical-and system. Extension may readily be made to other logical systems and to systems for combining three or more items of information.

The table of binary addition is shown in Table 1. To compute the sum of two binary digits, there may be used a logical exclusive-or system, certain embodiments of which are described herein. To find the carry digit resulting from the addition of two binary digits, there may be used a logical-and system, illustrative forms of which will be described.

TABLE 1

| Binary digit A | Binary digit B | Sum | Carry |
|---|---|---|---|
| 0 | 0 | 0 | 0 |
| 1 | 0 | 1 | 0 |
| 0 | 1 | 1 | 0 |
| 1 | 1 | 0 | 1 |

The result of one or more successive rotations of the direction of polarization of a plane polarized wave may be indicated in various ways. For example, at a specified location in the system, the wave may be accepted or rejected as by impressing the wave upon a polarization-selective means, a preferred example of such a means being a hollow pipe waveguide of rectangular cross-section. Such a waveguide will accept the wave if the direction of polarization of the wave is substantially parallel to the direction of the lesser cross-sectional dimension of the rectangular waveguide. Or, again at a specified location in the system, the wave may be selectively absorbed as in a directionally selective absorber such as one or more resistance rods or wires mounted in a direction parallel to the direction of the E-vector of the plane polarized wave, thereby preventing material transmission of the wave beyond the location of the absorber. Another way is by means of directionally selective detectors. Also, a wave may be selectively reflected as by one or more highly conductive rods or wires arranged parallel to the E-vector.

The required rotations of the direction of polarization may be obtained, for example, by the use of ferromagnetic gyrators. In a binary system, for example, a given gyrator may be magnetized and thereby energized to produce a rotation or it may be de-energized (demagnetized) so as not to produce a rotation, according to the digit or item of information to be represented.

A feature of systems in accordance with the invention is that the wave generator which supplies the reference wave faces substantially the same impedance or load condition regardless of whether one, none or more than one of the gyrators in the system is energized.

Another feature is that any circuit or transmission branch or path which is temporarily inactive during any phase of operation of the system may be preadjusted to act as an open circuit across the junction between the inactive branch and any active branch to which it is joined in order that the inactive branch may not materially alter or affect the load condition of the generator.

Illustrative embodiments of the invention which are shown herein include a logical-and system and a binary half adder but it should be understood that the invention is not, in its broadest aspect, limited to systems of the kind shown herein.

Other features, objects and advantages will appear from the following more detailed description of illustrative embodiments of the invention, which will now be given in conjunction with the accompanying drawings.

Figures 1, 2, 3, 5:
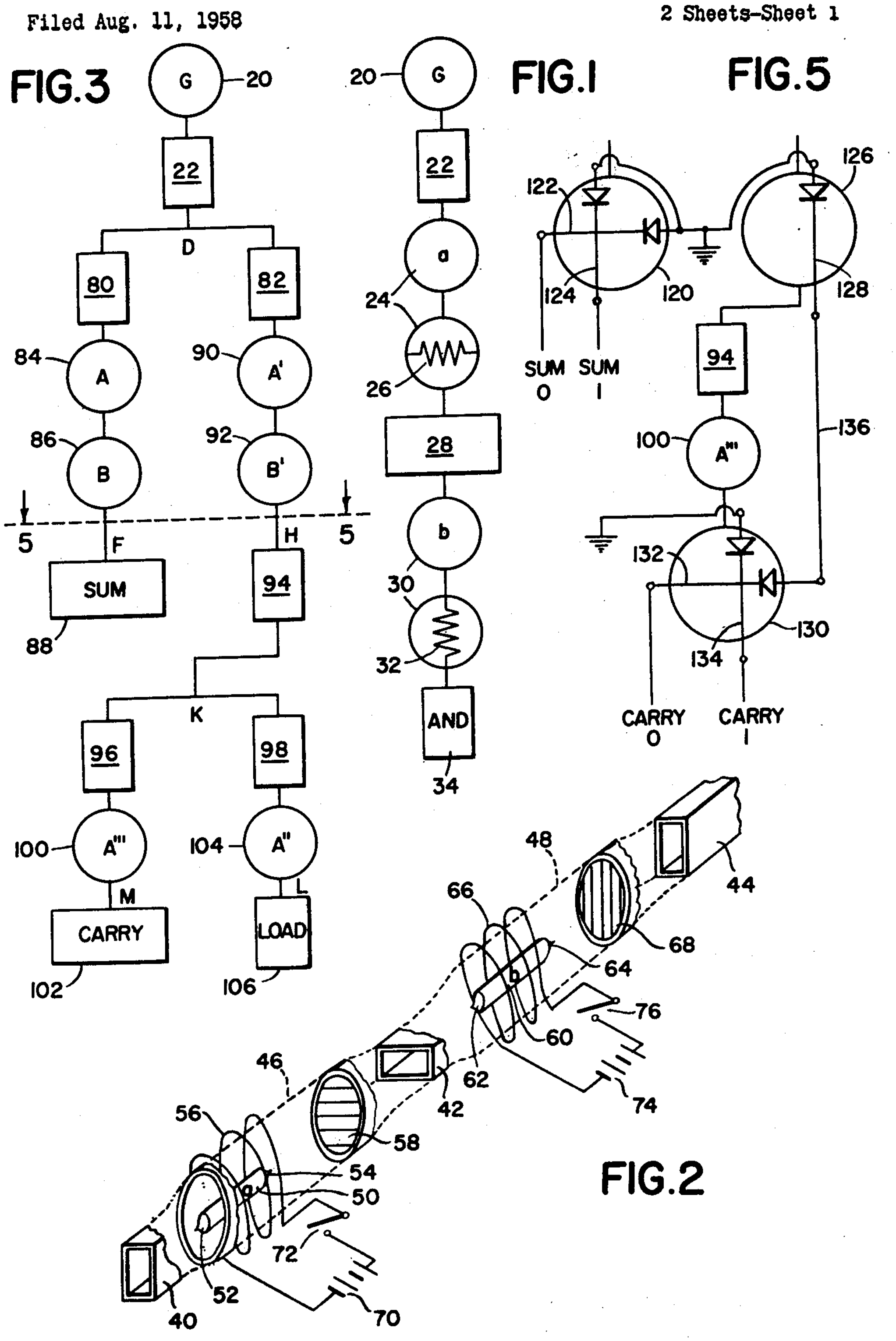
FIG. 1 is a schematic diagram of a logical-and system in accordance with the invention.
FIG. 2 is a perspective view, partly broken away and partly schematic, of apparatus embodying the system of FIG. 1.
FIG. 3 is a schematic diagram of a binary half adder in accordance with the invention.
FIG. 5 is a schematic diagram showing a modification of the portion of the system of FIG. 3 below the line 5—5.

FIG. 1 shows a logical-and system using gyrators. A suitable generator 20, such as a microwave oscillator, is connected to a hollow pipe waveguide 22 of rectangular cross-section. This waveguide is represented diagrammatically as a rectangle with its lesser cross-sectional dimension horizontal, indicating that the waveguide is selectively adapted for transmission of plane polarized waves in which the electric vector, or E-vector, lies in the horizontal direction in the plane of the drawing. The waveguide 22 is joined as by a suitably shaped transition pipe (not shown) to a circular cylindrical waveguide represented diagrammatically at 24 which contains gyrator means, designated *a*, that can be energized when desired to rotate the plane or direction of a plane polarized wave through an angle $\theta$, assumed to have the preferred value of 90 degrees, in one particular sense, for example, clockwise or counterclockwise, as the wave passes through the waveguide 24. The circular cylindrical waveguide 24 also contains a polarized absorptive element 26 which may be a diametrically positioned resistance wire located beyond the gyrator *a*, which absorptive element is selectively absorptive to a plane polarized wave that has its E-vector in the horizontal direction. The waveguide 24 is joined as by another suitably shaped transition pipe to a hollow pipe waveguide 28 of rectangular cross-section which has its lesser cross-sectional dimension at the angle $\theta$ to the corresponding dimension of the waveguide 22. For the preferred value of 90 degrees for $\theta$, the waveguide 28 has its lesser cross-sectional dimension in the vertical direction as shown.

In the preferred arrangement as shown in FIGS. 1 and 2, the waveguide 28 is joined as by a suitable transition to a circular cylindrical waveguide 30 which contains in tandem relation gyrator means, designated *b*, followed by a polarized absorptive element 32 which is selectively absorptive to a plane polarized wave that has its E-vector in the vertical direction. The gyrator means *b* can be energized when desired, to rotate the plane of a plane polarized wave through an angle of 90 degrees in one particular sense. The waveguide 30 is connected as through a suitable transition to a rectangular waveguide 34 which is so oriented as to be selective to a plane polarized wave with its E-vector horizontal.

In the operation of the system of FIG. 1 there will be no through transmission from generator 20 to the waveguide 34 unless gyrator means *a* and *b* are both energized so that each gyrator produces a 90 degree rotation in the plane of polarization of the wave which is to be passed through the system. Four cases may be distinguished. In case neither *a* nor *b* is energized, a wave of horizontal E-vector polarization passes from generator 20 through wave-guide 22 to the horizontally oriented absorber 26, and is absorbed thereby. Furthermore, the wave is polarized in the wrong direction to enter the waveguide 28. Both by reason of absorption in absorber 26 and rejection by waveguide 28, the wave is prevented from reaching the output waveguide 34. Substantially complete absorption at 26 is desirable in order that the generator 20 may work into a non-reflective load. In case *a* is not energized but *b* is, the wave is absorbed by the horizontal absorber 26, the same as in the first case when neither *a* nor *b* is energized. In case *a* is energized but *b* is not, the horizontally polarized wave from waveguide 22 is rotated 90 degrees by gyrator *a*, becoming converted thereby into a vertically polarized wave which passes the horizontal absorber 26 without being materially absorbed and passes freely through the waveguide 28. Because the wave receives no rotation from *b* it is absorbed by the vertical absorber 32 and rejected at waveguide 34 due to wrong polarization and so is again prevented from reaching the waveguide 34. Substantially complete absorption at 32 is desirable in order that the generator may work into a non-reflective load. In the remaining case, when both *a* and *b* are energized, the wave reaches the waveguide 28 as in the next previous case and now, since it receives a second 90 degree rotation from *b*, the wave is reconverted into a horizontally polarized wave, passes the vertical absorber 32 without material absorption and reaches the output waveguide 34. Thus it is seen that an output wave is produced in the waveguide 34 if, and only if, gyrators *a* and *b* are both energized. Hence the system performs the logical-and operation. The waveguide 34 is preferably suitably terminated to provide a non-reflective load for the generator.

FIG. 2 shows an illustrative embodiment of a logical-and system of the type given more diagrammatically in FIG. 1. A hollow pipe waveguide is shown having portions 40, 42, 44 of rectangular cross-section and portions 46, 48 of circular cylindrical form. Rectangular portion 42 is oriented at right angles to portions 40 and 44 which are of like orientation to each other. Circular portion 46 is located between rectangular portions 40 and 42 while circular portion 48 is located between rectangular portions 42 and 44. The pipe is continuous with suitable smooth transitions between rectangular and circular portions. The circular portion 46 contains a bar 50 of a suitable ferromagnetic material such as a ferrite possessing gyromagnetic properties. The bar 50 preferably has tapered end portions such as 52, 54. A magnetizing winding 56 is provided as in the form of a helical winding surrounding the circular waveguide structure in the region of the bar 50. A polarized absorber 58 is provided in the space between the ferrite bar 50 and the rectangular waveguide 42. The absorber 58 may comprise a plurality of resistance wires oriented parallel to the lesser cross-sectional dimension of the rectangular waveguide 40. In the circular waveguide 48 is provided a ferrite bar 60, similar to the bar 50, with tapered end portions 62, 64 and magnetizing winding 66. Between ferrite bar 60 and rectangular waveguide 44 there is located a vertically polarized absorber 68 which may comprise a plurality of resistance wires oriented parallel to the lesser cross-sectional dimension of the rectangular waveguide 42. A battery 70 and switch 72 are shown connected in series with winding 56 and a battery 74 and switch 76 in series with the winding 66.

In the operation of the system of FIG. 2 microwaves of suitable frequency are impressed upon rectangular waveguide 40 to produce therein plane polarized waves having their E-vector in the direction of the lesser cross-sectional dimension of waveguide 40, that is waves of horizontal polarization as viewed in the figure. The dimensions of the ferrite bars 50, 60, the magnetic properties of the windings 56, 66, and the voltages of the batteries 70, 74 are so chosen in accordance with principles known in the art of using ferrite or similar materials that when the switch is closed the corresponding ferrite bar will cause a rotation in a particular sense of 90 degrees in the plane of polarization of the wave passing through the region including the ferrite bar. In general, for a long thin pencil of a given ferromagnetic material subjected to a given magnetic field intensity that saturates the material, operating as is usually the case well above a certain frequency known as the ferromagnetic resonance frequency, the angle of rotation is linearly proportional to the length of the pencil. Representative values of the rotation are in the neighborhood of 50 to 150 degrees per centimeter length. If desired, any of the commercially available polarization rotators designed to rotate the plane of polarization 90 degrees in a cylindrical waveguide may be used as components in the systems described herein.

If switches 72 and 76 are both closed, a wave of horizontal polarization coming through rectangular waveguide 40 is converted into a vertically polarized wave in passing through ferrite bar 50. This vertically polarized wave passes through horizontal absorber 58 and vertically polarized waveguide 42 without material change. The wave is then converted into a horizontally polarized wave by ferrite bar 60 so that the wave passes through vertical absorber 68 and into horizontally polarized waveguide 44 without material change. The waveguide 44 may be suitably terminated to prevent reflection of waves back toward the generator and the wave in the guide 44 may be utilized as desired. If switch 76 is open, the wave passing through vertically polarized waveguide 42 receives no rotation in passing through ferrite bar 60 and is absorbed in vertical absorber 68 as well as being rejected at the entrance of the horizontally polarized rectangular waveguide 44. If switch 72 is open, the wave passing through horizontally polarized waveguide 40 receives no rotation in passing through ferrite bar 50 and is absorbed in horizontal absorber 58 as well as being rejected at the entrance of the vertically polarized rectangular waveguide 42. Accordingly, no wave reaches the output waveguide 44 unless both of the switches 72, 76 are closed. Thus the system performs the logical-and operation.

While the logical-and system of FIGS. 1–2 is shown as employing an increment of rotation of 90 degrees and the various waveguides are so designed and disposed as to discriminate between waves polarized at angles differing by 90 degrees, it is to be understood that an angle $\theta$ other than 90 degrees may be used instead.

For example, if an angle of 60 degrees is used, then in the system of FIGS. 1–2, the gyrator *a*, when energized, will rotate the direction of polarization 60 degrees, in say the clockwise sense. The absorptive element 26 may be as shown, selectively absorptive to a wave that has its E-vector in the horizontal direction. The waveguide 28 will have its direction of best transmission such that it is selective to a wave that has its E-vector rotated clockwise 60 degrees with respect to the reference standard. The gyrator *b*, when energized, may be arranged to give a rotation of 60 degrees again in the clockwise sense, in which case the waveguide 34 will have its direction of best transmission such that it is selective to a wave that has its E-vector rotated clockwise 120 degrees with respect to the reference standard. The absorptive element 32 may be made selectively absorptive to a wave that has its E-vector rotated clockwise 60 degrees with respect to the reference standard, so as to absorb a wave which receives a rotation at *a* but none at *b*.

The operation is similar to that already described. Unless the gyrator *a* is energized, a wave passing through the waveguide 22 is absorbed in absorber 26 or partially reflected at the input of waveguide 28, or both. If gyrator *a* is energized but gyrator *b* is not, the wave which is rotated at *a* will pass freely through waveguide 28, although absorber 26, if used, will reduce the wave somewhat in amplitude. The wave will, however, be absorbed in absorber 32 or partially reflected at the input of waveguide 34, or both. If both gyrators are energized, the wave will be freely transmitted by waveguide 34 after partial absorption in absorbers 26 and 32, thus indicating the presence of the logical-and relationship.

Instead of a clockwise rotation in gyrator *b*, a counterclockwise rotation of 60 degrees may be used. In that case, the waveguide 34 will have its direction of best transmission selective to the direction of polarization of the reference source as in FIGS. 1–2. The operation will be the same as described for the condition of a clockwise rotation at *b*.

It will be evident that the rotations at *a* and *b* may be made unequal in magnitude if desired, with suitable orientation of the waveguides 28 and 34.

In the sequel, wherever rotations of 90 degrees are specified it is to be understood that another angle $\theta$ may be substituted and the orientations of the waveguides adjusted accordingly to achieve the desired result.

It will be evident, however, that the use of 90 degree rotations is preferable in most instances. The system then is best adapted to make use of waveguides of rectangular cross-section for discriminating between polarization directions differing by 90 degrees. Also, a greater freedom of choice in the senses of the rotations is gained since a pair of successive 90 degree rotations in the same sense is equivalent to a pair of successive 90 degree rotations in opposite senses. This fact is used to advantage in maintaining good impedance matching conditions in the system of FIGS. 3–4.

FIG. 3 shows in schematic form a binary half adder employing waveguides and gyrators. It is a combination of elementary logical systems similar in general principles to the system of FIGS. 1 and 2. The generator 20 is connected to the horizontally polarized rectangular waveguide 22. The latter branches into two horizontally polarized rectangular waveguides 80, 82. The rectangular waveguide 80 is connected as through a transition pipe (not shown) to a circular cylindrical waveguide containing in tandem relationship two gyrator elements 84, 86. Through another transition section the circular waveguide is connected to a vertically polarized rectangular waveguide 88 which serves as output waveguide for the binary sum. The rectangular waveguide 82 is connected through a transition section to a circular cylindrical waveguide containing two gyrator elements 90, 92. Through a transition section the circular waveguide is connected to a horizontally polarized rectangular waveguide 94 which branches into horizontally polarized rectangular waveguides 96, 98. The waveguide 96 is connected through a transition section to a circular cylindrical waveguide containing a gyrator element 100 which in turn is connected through a transition section to a vertically polarized rectangular waveguide 102 which serves as the output waveguide for the carry resulting from the given binary addition. The waveguide 98 is connected through a transition to a circular cylindrical waveguide containing a gyrator element 104 which in turn is connected through a transition to a horizontally polarized rectangular waveguide 106 which serves as a dummy load output waveguide for the generator 20 whenever the generator is not connected through to either the sum output waveguide 88 or the carry output waveguide 102.

In the operation of the system of FIG. 3, the gyrator elements 84, 90, 100, and 104 will be referred to as A elements and are designated A, A′, A‴, and A″, respectively. They are used to represent one of two binary digits to be added. The gyrator elements 86 and 92, will be referred to as B elements, designated B and B′ respectively, and are used to represent the second binary digit to be added. All four A elements may be operated together, and when operated each A element causes a rotation of 90 degrees in the plane of polarization of a wave passing through the respective element. If desired, the gyrators 100 and 104 may be operated equally well as B elements instead of A elements, as will be shown below. The A elements are operated when the first binary digit to be added has the value of one. When the first binary digit to be added has the value of zero the A elements are not operated and no rotation of plane of polarization is produced by them. The B elements are operated together, and when operated each B element causes a rotation of 90 degrees in the plane of polarization of a wave passing through the respective element. Preferably, the gyrator 86 produces rotation in the reverse sense with respect to the rotation caused by the gyrator 84, while gyrators 90 and 92 produce rotations in like sense, to each other, for reasons which will appear hereinafter. When the second binary digit to be added is a one, the B elements are operated and when the second binary digit to be added is a zero, the B elements are not operated, and so have no effect on the wave passing through them.

In considering the operation of the system of FIG. 3 in performing binary addition reference should be made to the addition table of binary addition, which was given in Table 1.

In the case of 0 plus 0, none of the gyrators is operated. The horizontally polarized wave impressed upon rectangular waveguide 22 passes unchanged through horizontally polarized rectangular waveguide 80 and gyrators 84 and 86 but cannot enter the sum output waveguide 88 because this waveguide is vertically polarized. The wave, however, passes freely through rectangular waveguide 82, gyrators 90 and 92, rectangular waveguides 94, 96 and 98, and gyrators 100 and 104. The wave cannot enter the carry output waveguide 102 because this waveguide is vertically polarized. The wave does, however, enter the horizontally polarized dummy load output waveguide 106. The net result is that no wave reaches either the sum output waveguide or the carry output waveguide. The result conforms to Table 1, indicating 0 sum and 0 carry. The generator is, however, provided with a suitable termination by means of the dummy load output waveguide 106. Alternatively, the sum 0 may be identified by the horizontal polarization at the entrance to waveguide 88 and the carry 0 by the horizontal polarization at the entrance to waveguide 102. Means such as polarization-direction sensitive detectors are known for detecting the direction of polarization of a wave and their use will be illustrated hereinafter in a modification of the system of FIG. 3 shown by means of FIG. 5.

In the case of 0 plus 1, the A elements remain in the inoperative condition while the B elements are operated. Now the horizontally polarized wave passing through the gyrator 84 is rotated 90 degrees in the gyrator 86 and so is converted into a vertically polarized wave which passes into the sum output waveguide 88. The horizontally polarized wave passing through the gyrator 90 is rotated 90 degrees in the gyrator 92 which converts the wave into a vertically polarized wave which will not enter the horizontally polarized waveguide 94. The net result is an output in the sum output waveguide but no output in the carry output waveguide, which result conforms with Table 1, indicating a sum of 1 and a carry of 0. Alternatively, the carry 0 may be identified by the vertical polarization at the entrance to waveguide 94.

In the case of 1 plus 0, the A elements are operated but the B elements are not operated. The horizontally polarized wave passing through the waveguide 80 receives a 90 degree rotation in gyrator 84 after which it passes without further rotation in gyrator 86 and enters the sum output waveguide 88 since the wave has been converted by gyrator 84 into a vertically polarized wave. The horizontally polarized wave passing through the waveguide 82, however, is rotated 90 degrees in gyrator 90 and receives no further rotation in gyrator 92. Thus, having been converted into a vertically polarized wave by gyrator 90, this wave cannot enter horizontally polarized waveguide 94. The result is again a wave in the sum output waveguide and no wave in the carry output waveguide. This agrees with Table 1 which gives a sum of 1 and a carry of 0. Again, the carry 0 may also be identified by the vertical polarization at the entrance to waveguide 94.

In the last case, namely 1 plus 1, all the gyrators are operated. The vertically polarized wave produced by and emerging from the gyrator 84 receives a second 90 degree rotation in gyrator 86, reconverting the wave to horizontal polarization so that the wave now cannot enter the sum output waveguide. The vertically polarized wave produced by and emerging from the gyrator 90 receives a second 90 degree rotation in gyrator 92 and so is reconverted to horizontal polarization. This wave now passes freely through the horizontally polarized waveguides 96 and 98 and is given another 90 degree rotation in each of the gyrators 100 and 104. Vertically polarized waves therefore emerge from both gyrators 100 and 104. The wave from gyrator 100 enters the vertically polarized carry output waveguide 102, but the wave from gyrator 104 cannot enter the horizontally polarized dummy load output waveguide 106. The result is an absence of output in the sum output waveguide and the presence of an output in the carry output waveguide, in accordance with Table 1, indicating a sum of 0 and a carry of 1. Again, the sum 0 may be identified by the horizontal polarization at the entrance to waveguide 88.

In order that the generator 20 may work into a total load which is substantially unvaried regardless of which of the four cases is presented, it is not only necessary to provide the dummy load output waveguide which is intended to provide the only load for the generator in the case of 0 plus 0, but it is also necessary to avoid any shunting effect of parallel waveguide paths. For example, in the case of 0 plus 0, the waveguide branch path D to F leading to sum output waveguide 88 is a shunt path at junction point D in FIG. 3 which is connected across the active path leading to waveguide 82. Furthermore, in this same case, the path K to M comprising waveguide 96, gyrator 100, and carry output waveguide 102, which path is inactive, is a shunt across the active path K to L leading to the dummy load. This shunt is connected at junction point K in FIG. 3. In the case of 0 plus 1, the path from junction point D to the entrance point H of waveguide 94 is a shunt across the active path from D to the entrance point F of the waveguide 88. The same situation holds for the case of 1 plus 0 in this respect as for the case of 0 plus 1. In the case of 1 plus 1, the path D to F forms a shunt upon the active path at junction point D and the inactive path from the point K to the entrance point L of the waveguide 106 forms a shunt across the active path K to M at the point K. It is required that in every case the inactive shunt paths shall appear as open circuits or as substantially infinite impedance shunts across the active paths at the respective junction points. It will be noted that in each case the inactive path extends to a point where the wave is rejected by a rectangular waveguide of the wrong polarity to receive the wave in question. This is to say that the wave is substantially totally reflected at this point, or in other words, the circuit is in effect open at this point. If now the point of such reflection is located at a distance of a suitable number of quarter wavelengths from the junction where an infinite shunting impedance is desired, the open circuit condition present at the point of reflection will be repeated at the junction point, thus giving the desired effect at the junction. Polarization direction selective reflectors of forms other than rectangular waveguides are available and may also be used as desired. One form of such a reflector consists of a grid of non-resistive wires or rods oriented parallel to the direction of polarization of the wave to be reflected. Such a grid is similar in form to the polarization direction selective absorbers 58 and 68, except that the latter consist of resistance elements. The grid should be located at a distance of an odd number of quarter wavelengths from the point where an open circuit effect is desired.

It will be noted that to achieve the desired effect it is necessary that the wave reflected back through the inactive path to the junction point arrive at the junction point with the same direction and sense of polarization as the incident wave at the junction point, otherwise the effect will not be that of an open circuit termination .

More particularly, the paths which are to be rendered of substantially infinite shunt impedance and the conditions under which this impedance is to be maintained are as follows. The path DF containing the gyrators 84 and 86 must meet the requirements under two different conditions, namely when neither of the gyrators 84, 86 is operated for the case of 0 plus 0 and also when both of these gyrators are operated as in the case of 1 plus 1. The path DH containing the gyrators 90 and 92 need meet the requirements under only one condition, namely when one gyrator is operated and the other gyrator is not operated, as in the case of 1 plus 0 and also in the case of 0 plus 1. The path KM containing the single gyrator 100 need meet the requirements only when gyrator 100 is not operated, as in the case of 0 plus 0. Finally, the path KL containing the single gyrator 104 need meet the requirements only when gyrator 104 is operated, as in the case of 1 plus 1.

At this point it is helpful to consider the effect of the presence of the gyromagnetic material such as ferrite upon the speed of propagation of the waves, inasmuch as this speed affects the adjustment of path lengths to definite values in terms of wavelengths or fractions thereof. It is a fact that the speed of propagation of the high frequency energy in an operated, that is, magnetized, gyrator is different from that in an unoperated, that is, non-magnetized, gyrator. In the magnetized gyrator a plane polarized wave behaves as if it were decomposed into two circularly polarized waves in which the circuit polarizations in the two component waves are in opposite senses. The circularly polarized wave component which rotates in the clockwise direction as seen looking along the direction of the steady applied magnetizing field in the gyrator is by convention termed the positive component and it travels with a speed of propagation which is less than the speed of propagation in the unmagnetized gyrator in the usual operating condition in which the operating frequency is above a critical frequency known as the frequency of ferromagnetic resonance. The other circularly polarized wave component, which rotates in the counterclockwise direction as seen looking along the direction of the steady applied magnetizing field in the gyrator, is termed the negative component and it travels with a speed of propagation which is greater than the speed of propagation in the unmagnetized gyrator at the same frequency of operation. The two circularly polarized wave components after traveling through the gyrator at different speeds recombine upon leaving the gyrator to form a plane polarized wave which in general has a different direction of polarization from that of the wave as it entered the gyrator. In this way the theory accounts for the observed rotation of the plane of polarization of the wave in passing through the magnetized gyrator.

The matter of the difference in speed of propagation in the magnetized and in the unmagnetized condition of the gyrator does not complicate the adjustment of the path lengths in the paths KM and KL, because each of these paths need be adjusted for only one of these conditions. Path KM is to be adjusted for one unoperated gyrator, and path KL for one operated gyrator. Each of these paths may be adjusted in length by simply varying the total length of hollow pipe employed. The path DF, on the other hand, must present a length of a critical number of quarter wavelengths regardless of whether the gyrators 84 and 86 are both magnetized or both unmagnetized. It is found that this condition is met to a good degree of approximation of the gyrators 84, 86, when magnetized are magnetized in opposite senses. This means that gyrator 84 when operated rotates the plane of polarization 90 degrees in one sense and the gyrator 86 when operated rotates the plane of polarization back 90 degrees to the original plane. Then in the magnetized state the positive component in the first gyrator becomes a negative component in the second gyrator and the negative component in the first gyrator becomes the positive component in the second gyrator. Thus a compensatory effect is obtained with respect to the speed of propagation for each component and the result does not differ greatly from the condition in the unmagnetized gyrators.

The matter of the reflection of the wave in the proper direction and sense of polarization will now be considered. In the DF path in the case of 0 plus 0, neither gyrator 84 nor 86 is operated. There is no change in the direction of polarization during the transmission from D to F and return, so a path length of an integral number of half wavelengths from D to F is appropriate to insure that the reflected wave arrives back at D with the same direction and sense of polarity as the incident wave at D. In the DF path in the case of 1 plus 1, the two gyrators operate in opposite senses. The wave leaving D with horizontal polarization is rotated, say clockwise to the vertical in gyrator 84 and back counterclockwise to the horizontal in gyrtaor 86. The wave is reflected at F as at an open circuit without change in direction or sense of polarization. The wave is then rotated to vertical and back to horizontal by gyrators 86 and 84 in turn and the net result is that the wave arrives at D with the same direction and sense of polarization as the incident wave at D. So, again a path length of an integral number of half wavelengths from D to F is appropriate and there is no conflict between the path length requirements for the two conditions.

In the path KM in the case of 0 plus 0, the single gyrator 100 is not operated. Hence there is no change in the direction or sense of the wave during the passage from K to M and back, and a path length of an integral number of half wavelengths from K to M is appropriate.

In the DH path in the case of 1 plus 0 or in the case of 0 plus 1, only one or the other of the gyrators 90, 92 is operated. In either case, the wave receives two rotations of 90 degrees each in the same sense. The result is that the wave returns to junction D with the opposite sense of polarization from what it had at the start. Hence, the path length from D to H should be adjusted to an odd number of quarter wavelengths in order that the reflected wave will have the same direction and sense of polarization as the incident wave at D.

In the KL path in the case of 1 plus 1, the situation is similar to that discussed immediately above with respect to the DH path, in that only one gyrator is operated. Hence, the path from K to L should be adjusted to an odd number of quarter wavelengths.

With regard to the path DH, it is desirable that the gyrators 90 and 92 be magnetized in like senses, so that the speed of propagation will be the same whichever gyrator is magnetized.

In summary, it will be seen that the system of FIG. 3 is arranged to carry out a plurality of elementary logical operations. One of these is the exclusive-or operation performed in the branch DF for indicating the binary sum digit one resulting from the addition of digits A and B when these digits are unlike. Another operation is carried out in branch DH which responds by providing through transmission when digits A and B are alike, regardless of whether they are zeros or ones. The output of branch DH branches again at K. The sub-branch KM responds by providing through transmission when the digits A and B are ones, thereby indicating a carry digit one. The sub-branch KL, on the other hand, responds by providing through transmission when the digits A and B are zeros, thereby connecting the generator 20 through to the dummy load 106. While other arrangements of gyrators and polarization-direction selective waveguides may be devised to provide the same over-all effect in a binary half adder, the arrangement shown in FIG. 3 is preferred because, as has been shown above, it is readily adjusted to provide a substantially constant load condition for the generator regardless of the particular combination of digits to be added.

It has been noted that the gyrators 100 and 104 may equally well be operated as A gyrators as shown, or as B gyrators. The reason for this will now be evident, since these gyrators enter into the over-all operation of the system only (1) when neither the A nor the B gyrators are energized or (2) when both the A and the B gyrators are energized.

Figure 4:
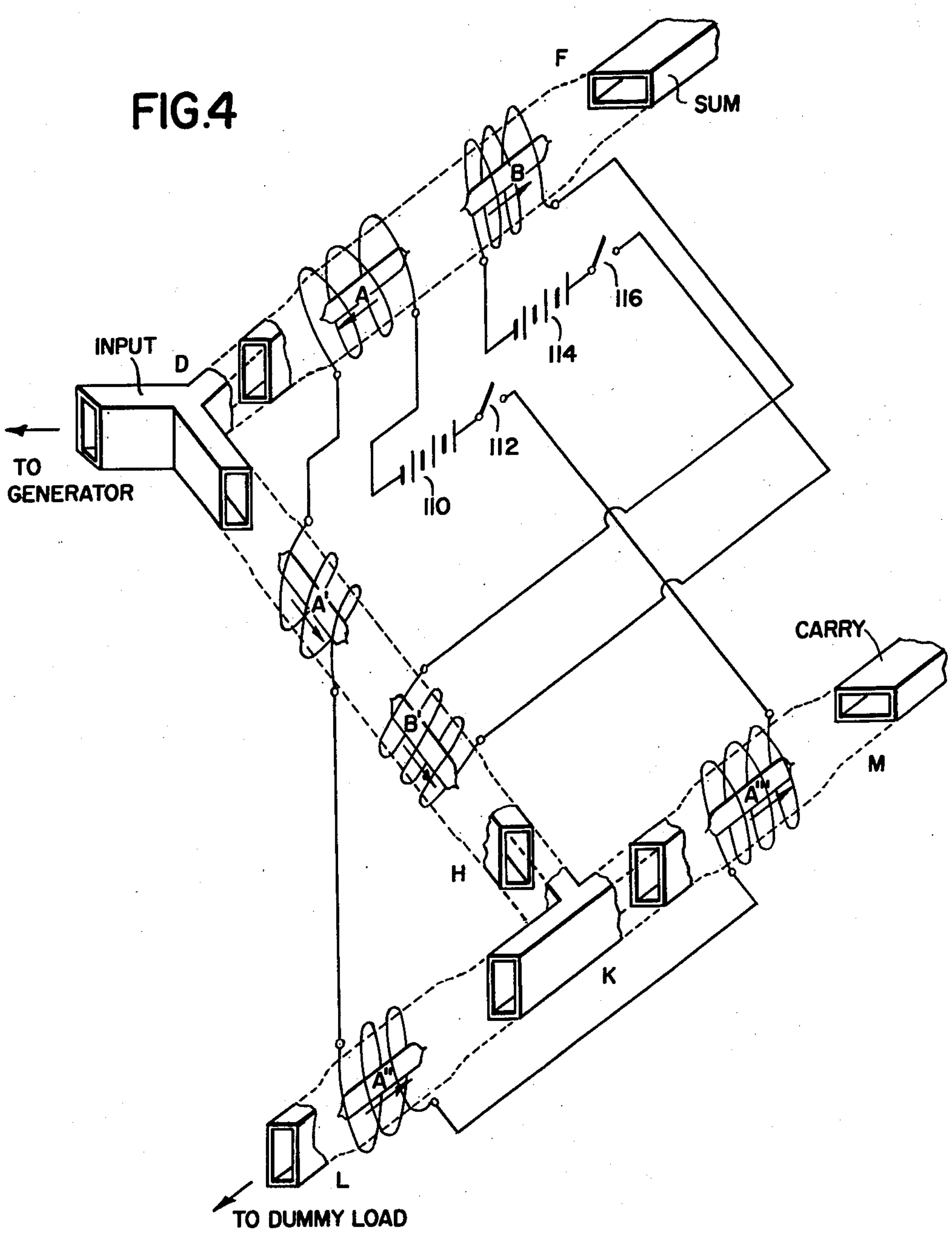
FIG. 4 is a perspective view, partly broken away and partly schematic, of apparatus embodying the system of FIG. 3.

FIG. 4 shows in more detail the spatial relationships of the parts of a system like that of FIG. 3. The junction points D, F, H, K, L and M are shown in relationship to the various branches and the locations of the gyrator elements A, B, A′, B′, A″ and A‴ are indicated. In addition, the relative senses of the magnetizing fluxes in the respective gyrators are indicated by arrows. A battery 110 and switch 112 are shown for magnetizing all of the A gyrators simultaneously. Another battery 114 and switch 116 are shown for magnetizing the B gyrators together.

The operation of the system of FIG. 4 is substantially the same as that of the system of FIG. 3. In particular, when switch 112 is open a digit zero is added as the first digit. When this switch is closed, a digit one is added as the first digit. When switch 116 is open a digit zero is added as the second digit and when switch 116 is closed a digit one is added as the second digit. Closing of both switches magnetizes gyrators A and B in opposite senses and magnetizes fiyrators A′ and B′ in like senses. The senses of magnetization of the gyrators A‴ and A″ may be arbitrary.

As in the system of FIG. 3, the sum output waveguide will receive energy from the generator if, and only if, one of the switches 112 and 116 is open and the other is closed. The carry output waveguide will receive energy from the generator if, and only if, switches 112 and 116 are both closed. When switches 112 and 116 are both open, the energy is fed to the dummy load. The generator is always looking into a substantially matched load independent of the settings of the switches.

FIG. 5 shows how the portion of the system of FIG. 3 below the line 5—5 may be modified to indicate the sum and carry by detecting the direction of polarization of a wave instead of the presence or absence of a wave. In the sum-branch, the rectangular waveguide 88 is replaced by a circularly cylindrical waveguide 120 containing a horizontally polarized detector 122 comprising a horizontally oriented receiving conductor and associated rectifier and a similarly constituted but vertically polarized detector 124. One terminal of each of these detectors may be grounded as shown in the figure. In the carry branch, a circular cylindrical waveguide 126 with a vertically polarized detector 128 with one terminal grounded is inserted ahead of rectangular waveguide 94. Components 96, 98, 104 and 106 are not needed in this modified system. The gyrator unit 100 is connected to the output terminal of the waveguide 94 and a circular cylindrical waveguide 130 containing a horizontally polarized detector 132 and a vertically polarized detector 134 is connected in place of the rectangular waveguide 102. One terminal of the detector 134 is grounded. A lead 136 connects the ungrounded terminal of detector 128 to one terminal of detector 132.

In the operation of the modification shown in FIG. 5, a wave of horizontal polarization at waveguide 120 indicates a sum of 0 and generates a pulse in horizontal detector 122, but due to directional selectivity, no pulse in detector 124. Similarly a wave of vertical polarization at waveguide 120 indicates a sum of 1 and generates a pulse in detector 124 but none in detector 122. Hence, pulses at the outputs of detectors 122 and 124 represent sum 0 and sum 1, respectively. In the carry branch, in the case of 0 plus 0, a horizontally polarized wave entering waveguide 126 has substantially no effect upon detector 128 and passes on through rectangular waveguide 94 and circular waveguide 100 without change in polarization. In waveguide 130, this wave generates a pulse in horizontally polarized detector 132 but no pulse in vertically polarized detector 134, thereby indicating a carry of 0. In the cases of 0 plus 1 and 1 plus 0, a vertically polarized wave is received at circular waveguide 126 wherein a pulse is generated in vertically polarized detector 128. The vertically polarized wave is preferably substantially absorbed by detector 128 so that reflection at the horizontally polarized waveguide 94 will not adversely affect the generator. The pulse from detector 128 passes through the lead 136 and the detector 130 to the carry 0 output terminal as shown in the figure. In the case of 1 plus 1, a horizontally polarized wave is received at circular waveguide 126. This wave passes through waveguides 126 and 94 without absorption or change in polarization but is changed to a vertical polarization in gyrator 100. The wave then generates a pulse in vertically polarized detector 134, indicating a carry of 1. No dummy load branch is required in the system as modified by FIG. 5 inasmuch as in every case the generator feeds eventually into two parallel connected polarized detectors providing substantially unvarying loads.

While an illustrative form of apparatus and a method in accordance with the invention have been described and shown herein, it will be understood that numerous changes may be made without departing from the general principles and scope of the invention.

What is claimed is:

1. In a binary adder, in combination in a wave transmission system for plane polarized waves, first polarization-direction selective wave guiding means, branched transmission paths for said waves connected to said wave guiding means and comprising in tandem relationship to each other in a first branch path in the order named, first and second polarization-direction rotating means, and second polarization-direction selective wave guiding means selective to a direction materially different from the direction to which said first wave guiding means is selective, and in a second branch path in tandem relationship to each other in the order named, third and fourth polarization-direction rotating means, a third polarization-direction selective wave guiding means selective to the same direction as said first wave guiding means, a fifth polarization-direction rotating means, and a fourth polarization-direction selective wave guiding means selective to a direction materially different from the direction to which said first wave guiding means is selective, said first and third rotating means being controllable in accordance with the value of a given digit A, said second and fourth rotating means being controllable in accordance with the value of a given digit B, and said fifth rotating means being controllable in accordance with the value of an arbitrarily assignable one of said digits A and B, whereby the binary sum of digits A and B is indicated in said first branch and the resulting carry digit is indicated in said second branch.

2. In a binary adder, in combination, a reference source of plane polarized waves, polarization-direction selective transmission means selective to the direction of polarization of the waves from said source, said means being connected to said source, first and second wave transmission branch paths connected to said means, said branch paths each including two polarization-direction rotating means for selectively introducing when energized a rotation of 90 degrees, one said rotating means in each said branch being controllable in accordance with the value of a given digit A and the other said rotating means in each said branch being controllable in accordance with the value of a given digit B, means in the output of said first branch selectively accepting a wave with its direction of polarization at an angle of 90 degrees from the direction of polarization of the reference source, means in the output of said second branch selective to a wave with the same direction of polarization as the reference source, further means in said second branch following said last-mentioned means, said further means comprising polarization rotating means controllable in accordance with the value of an arbitrarily assignable one of said digits A and B, followed by means selective to a wave with its direction of polarization at an angle of 90 degrees from the direction of polarization of the reference source, whereby the output of said first branch indicates the sum digit and the output of the said second branch indicates the resulting carry digit.

3. Apparatus in accordance with claim 2, in which at least one of the said polarization-direction selective transmission means comprises a hollow-pipe type of waveguide of rectangular cross-section.

4. Apparatus in accordance with claim 2, in which at least one of the said polarization-direction rotating means is a ferromagnetic gyrator.

5. In a binary adder, in combination, a reference source of plane polarized waves, polarization-direction selective transmission means selective to the direction of polarization of the waves from said source, said means being connected to said source, first and second wave transmission branch paths connected to said means, said branch paths each including two polarization-direction rotating means for selectively introducing when energized a rotation of 90 degrees, one said rotating means in each said branch being controllable in accordance with the value of a given digit A and the other said rotating means in each said branch being controllable in accordance with the value of a given digit B, means in the output of said first branch selective to a wave with its direction of polarization at an angle of 90 degrees from the direction of polarization of the reference source, means in the output of said second branch selective to a wave with the same direction of polarization as the reference source, third and fourth wave transmission branch paths connected to the output of said second branch, said third and fourth branches each containing a polarization rotating means for selectively introducing when energized a rotation of 90 degrees, each said polarization rotating means being controllable in accordance with the value of a single independently assignable one of said digits A and B, means in the output of said third branch selective to a wave with its direction of polarization at an angle of 90 degrees from the direction of polarization of the reference source, and means in the output of said fourth branch selective to a wave with the same direction of polarization as the reference source, whereby the output of said first branch indicates the sum digit, the output of the third branch indicates the resulting carry digit, and the fourth branch provides a dummy load for the source when the sum and carry digits are both of value zero.

6. In a binary adder, in combination, a source of plane polarized waves having a substantially uniform initial direction of polarization, branched transmission paths for said waves connected to said wave source and comprising in tandem relationship to each other in a first branch path in the order named first and second polarization-direction rotating means, and first polarization-direction selective wave guiding means selective to a direction materially different from the said initial direction of polarization of the waves, and in a second branch path in tandem relationship to each other in the order named third and fourth polarization-direction rotating means, a second polarization-direction selective wave guiding means selective to substantially the said initial direction of polarization, a fifth polarization-direction rotating means, and a third polarization-direction selective wave guiding means selective to a direction materially different from said initial direction of polarization, one of said first and second rotating means and one of said third and fourth rotating means being controllable in accordance with the value of a given digit A, the other of said first and second rotating means and the other of said third and fourth rotating means being controllable in accordance with the value of a given digit B, and said fifth rotating means being controllable in accordance with the value of an arbitrarily assignable one of said digits A and B, whereby the binary sum of digits A and B is indicated in said first branch and the resulting carry digit is indicated in said second branch.

7. A logic system for combining items of information, which system comprises, a source of plane polarized waves having a substantially uniform initial direction of polarization, branched transmission paths for said waves connected to said source and comprising in tandem relationship to each other in a first branch path in the order named: first and second polarization-direction rotating means, and first polarization-direction selective means selective to a direction materially different from the said initial direction of polarization of the waves; and in a second branch path in tandem relationship to each other in the order named: third and fourth polarization-direction rotating means, and a second polarization-direction selective means selective to substantially the said initial direction of polarization; one of said first and second rotating means and one of said third and fourth rotating means being controllable according to a first item of information, and the other of said first and second rotating means and the other of said third and fourth rotating means being controllable according to a second item of information, and interconnecting means operative by waves of substantially all direction of polarization connecting the output of said first rotating means to the input of said second rotating means.

8. A logic system for combining items of information, which system compirses a source of plane polarized waves having a substantially uniform initial direction of polarization, branched transmission paths for said waves connected to said source and comprising in tandem relationship to each other in a first branch path in the order named: first and second polarization-direction rotating means, and first polarization-direction selective means selective to a direction materially different from the said initial direction of polarization of the waves; and in a second branch path in tandem relationship to each other in the order named: third and fourth polarization-direction rotating means, and a second polarization-direction selective means; one of said first and second rotating means and one of said third and fourth rotating means being controllable according to a first item of information, and the other of said first and second rotating means and the other of said third and fourth rotating means being controllable according to a second item of information, and interconnecting means operative by waves of substantially all directions of polarization connecting the output of said first rotating means to the input of said second rotating means.

References Cited in the file of this patent

UNITED STATES PATENTS

| | | |
|---|---|---|
| 2,694,521 | Newman et al. | Nov. 16, 1954 |
| 2,758,787 | Felker | Aug. 14, 1956 |
| 2,864,953 | De Lange | Dec. 16, 1958 |
| 2,875,416 | Fox | Feb. 24, 1959 |
| 2,914,249 | Goodall | Nov. 24, 1959 |
| 2,936,380 | Anderson | May 10, 1960 |

OTHER REFERENCES

Williams et al.: University High Speed Computers—Serial Computing Circuits Proceedings of the Institute of Electrical Engineers, April 1952, pages 111, 112.

Operational Theory, Uniline—Operational Theory, Gyraline, Cascade Research Corporation, 53 Victory Lane, Los Gatos, California. Received in U.S. Patent Office Apr. 4, 1956.

UNITED STATES PATENT OFFICE

CERTIFICATE OF CORRECTION

Patent No. 3,074,637 January 22, 1963

Hermann P. Wolff

It is hereby certified that error appears in the above numbered patent requiring correction and that the said Letters Patent should read as corrected below.

Column 8, line 65, for "circuit" read -- circular --; column 9, line 28, for "of" read -- if --; column 10, line 62, for "fiyrators" read -- gyrators --; column 14, line 45, for "University" read -- Universal --.

Signed and sealed this 24th day of September 1963.

(SEAL)
Attest:

ERNEST W. SWIDER
Attesting Officer

DAVID L. LADD
Commissioner of Patents